United States Patent [19]

Shima et al.

[11] 4,109,188
[45] Aug. 22, 1978

[54] INDEX DEVICE FOR TOOL STORAGE MAGAZINE

[75] Inventors: Yoshio Shima, Ohbu; Shigeo Noda, Nagoya; Kaoru Owa, Aichi, all of Japan

[73] Assignee: Toyoda-Koki Kabushiki-Kaisha, Japan

[21] Appl. No.: 759,676

[22] Filed: Jan. 17, 1977

[30] Foreign Application Priority Data

Nov. 6, 1976 [JP] Japan ............................ 51-133644

[51] Int. Cl.² ........................................... G05B 19/28
[52] U.S. Cl. ..................................... 318/602; 29/568
[58] Field of Search ............... 29/568, 26 A; 318/602, 318/563, 565

[56] References Cited

U.S. PATENT DOCUMENTS

| 3,249,997 | 5/1966 | Hutchens | 29/568 |
| 3,657,627 | 4/1972 | Inaba et al. | 29/568 X |
| 3,689,820 | 9/1972 | Takegawa | 318/602 |
| 3,744,124 | 7/1973 | Gardner | 29/568 |
| 3,774,100 | 11/1973 | Barber | 29/568 X |

Primary Examiner—Gil Weidenfeld
Attorney, Agent, or Firm—Oblon, Fisher, Spivak, McClelland & Maier

[57] ABSTRACT

An index device for indexing a rotatable magazine, having a plurality of tool holding devices which store a variety of tools and are addressed in a numerical order, to a predetermined tool change position for a tool exchange operation. A check signal is generated each time a specific tool holding device having an address of a predetermined binary coded state is indexed to the tool change position. A memory device stores a binary coded number of a tool holding device indexed at the tool change position. An abnormality is checked in accordance with a check signal and a content of the memory device.

6 Claims, 3 Drawing Figures

__NUM__4,109,188__NUM__

INDEX DEVICE FOR TOOL STORAGE MAGAZINE

BACKGROUND OF THE INVENTION

1. Field of the Invention:

The present invention relates to an index device for indexing a rotatable magazine having a plurality of tool holding devices to a predetermined tool change position for a tool exchange operation.

2. Description of the Prior Art:

For indexing a rotatable magazine provided with a plurality of tool holding devices being addressed in a numerical order to a predetermined tool change position, an index signal is generated each time each tool holding device is indexed to the tool change position. An up-down counter counts the index signal in order to distinguish an address of the tool holding device indexed to the tool change position. When the content of the counter coincides with a commanded address, rotation of the magazine is stopped to position the tool holding device having the command address at the tool change position. However, if the counter miscounts the index signal, the address of the tool holding device having been indexed to the tool change position does not coincide with the content of the counter. Accordingly, an incorrect tool holding device is indexed to the tool change position and the malfunction is overlooked.

SUMMARY OF THE INVENTION

It is therefore an object of the present invention to provide a new and improved index device for a rotatable magazine capable of detecting that an incorrect tool holding device has been indexed to the tool change position.

Another object of the present invention is to provide a new and improved index device wherein a check signal is generated each time a specific tool holding device having an address of a predetermined binary coded state is indexed to the tool change position and a memory device stores a binary coded number of a tool holding device indexed at the tool change position so as to check the abnormality of the indexing operation.

According to the present invention, the foregoing and other objects are attained by the provision of an index device for indexing a rotatable magazine, having a plurality of tool holding devices which store a variety of tools and are addressed in a numerical order, to a predetermined tool change position for a tool exchange operation between a tool indexed at the tool change position and a tool held in a spindle of a machine tool by means of a tool exchange device, which comprises means for generating an index signal each time each tool holding device is indexed to the tool change position, means for generating a check signal each time a specific tool holding device having an address of a predetermined binary coded state is indexed to the tool change position, means for rotating the rotatable magazine, means for commanding in a binary code a tool to be indexed to the tool change position, first memory means for storing a binary coded number of a tool held in the spindle, second memory means for storing a relationship between binary coded numbers of the tool holding devices and the tools held in the respective tool holding devices, third memory means responsive to the command means for storing a binary coded number of the commanded tool, fourth memory means responsive to the index signal generating means for storing a binary coded number of a tool holding device indexed at the tool change position, means responsive to the command means for searching a number of a tool holding device holding the commanded tool from the second memory means, fifth memory means responsive to the search means for storing the searched number of the tool holding device, means for determining a rotational direction of the magazine in accordance with a difference in the contents stored in the fourth and fifth memory means to thereby cause the rotating means to rotate the magazine and for checking coincidence of the contents in the fourth and fifth memory means, abnormality check means for checking, in accordance with the index signal generating means and the fourth memory means, whether a tool holding device holding the commanded tool is correctly indexed to the tool change position after the coincidence of the contents in the fourth and fifth memory means has been found and for causing the rotating means to stop rotation of the magazine to thereby cause a tool exchange operation to be performed when the abnormality is not found, and means for loading the content of the third memory means into the first memory means and for loading the content of the first memory means into the second memory means after the tool exchange operation has been completed.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
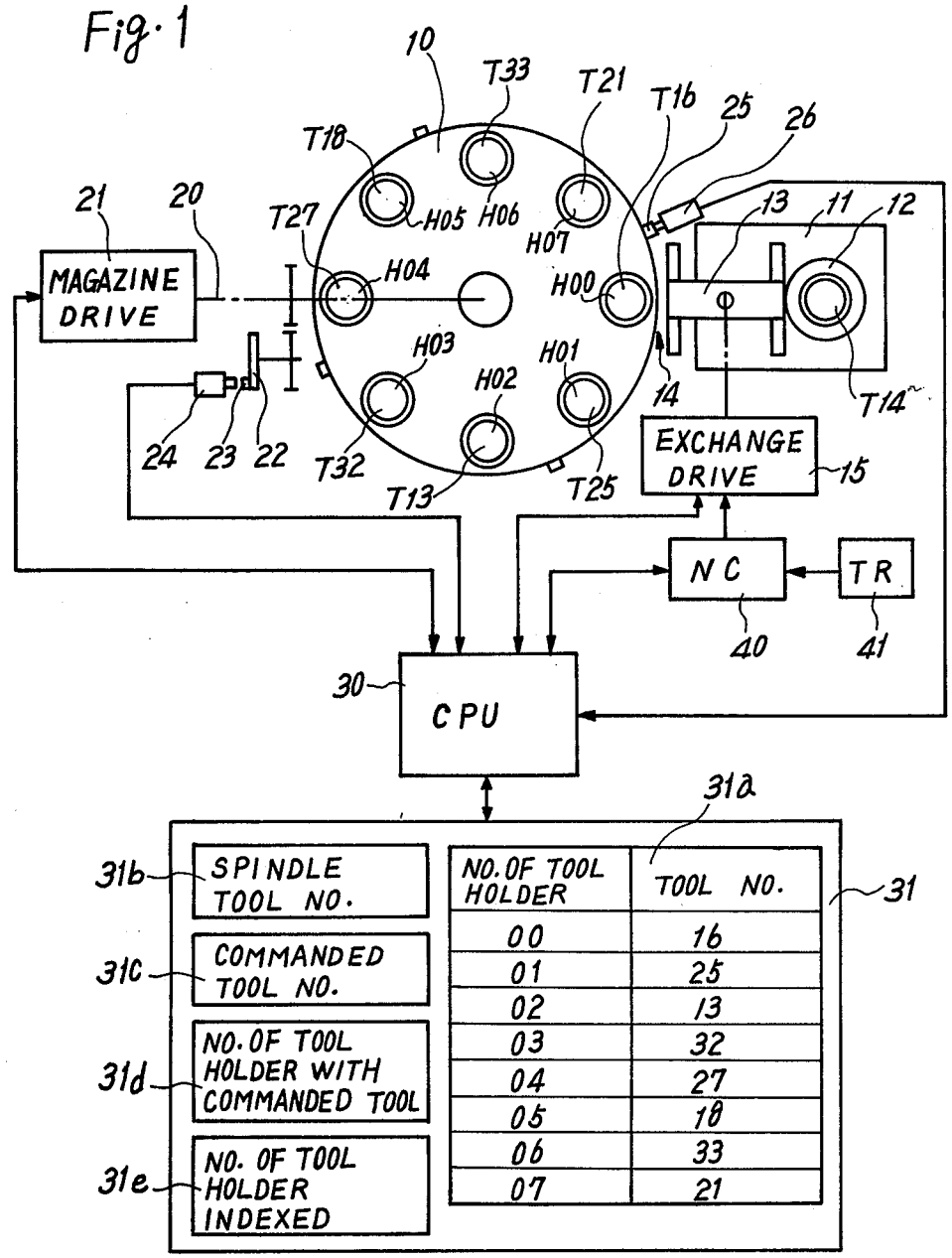
FIG. 1 is a schematic block diagram of an embodiment of a tool magazine index device according to the present invention.

Referring now to the drawings, wherein like reference numerals or characters refer to identical or corresponding parts throughout the several views, and more particularly to FIG. 1, there is shown a tool storage magazine 10 which is rotatably mounted on a body of a machine tool, not shown. A plurality of, for example, eight tool holding devices HO0 to HO7 are equidistantly arranged on the periphery of the magazine 10 and are addressed in numerical order from 00 to 07 in a clockwise direction. A spindle head 11 is provided to rotatably support a spindle 12. A tool exchange device 13 is mounted on the spindle head 11 in such a manner as to exchange the tool held in the spindle 12 for the tool at a tool change position 14 on the tool storage magazine 11 by means of an exchange device driving device 15. A rotary shaft 20 of the tool storage magazine 10 is connected to a magazine driving device 21 to be rotated thereby in response to a command given from a computer 30. An index plate 22 is connected to the rotary shaft 20 through gears in such a manner as to be rotated one revolution when the magazine is rotated one pitch or a distance between two adjacent tool holding devices. A projection 23 is provided on the index plate 22 to actuate a corresponding proximity switch 24 to apply an index signal to the computer 30, each time the magazine 10 is rotated one pitch, that is, each tool holding device is indexed to the tool change position. A plurality of, for example, four in this particular embodiment, dogs 25 are fixed on the outer periphery of the magazine 10. Each dog 25 corresponds with the specific tool holding device which has, in this particular embodiment, an even address number, such as 00, 02, 04 or 06 in FIG. 1, whose least significant digit bit is in a "0" state when represented by a binary coded format. A limit switch 26 is provided to be actuated by each dog 25 to apply a check signal to the computer 30. A numerical control device (NC device) 40 applies machining data to the machine tool, not shown, data for a required tool to the computer 30 and a tool exchange command to the exchange device driving device 15 in response to NC data read out by a tape reader 41. A memory device 31 stores data in a binary coded format and comprises an area 31a for storing a table of a relationship between the number of the tool holding device and the number of a tool held in the respective tool holding device, an area 31b for storing the number of a tool received in the spindle 12, an area 31c for storing the number of a required tool commanded by NC data, an area 31d for storing the number of a tool holding device which holds the required tool, and an area 31e responsive to the index signal from the proximity switch 24 for storing the number of a tool holding device which is indexed at the tool change position 14. The table stored in the area 31a is prepared by a manual setting device, not shown, prior to the operation of the machine. The content of the memory device 31 is rewritten by the computer 30, each time a tool exchange operation has been performed.

Figure 2:
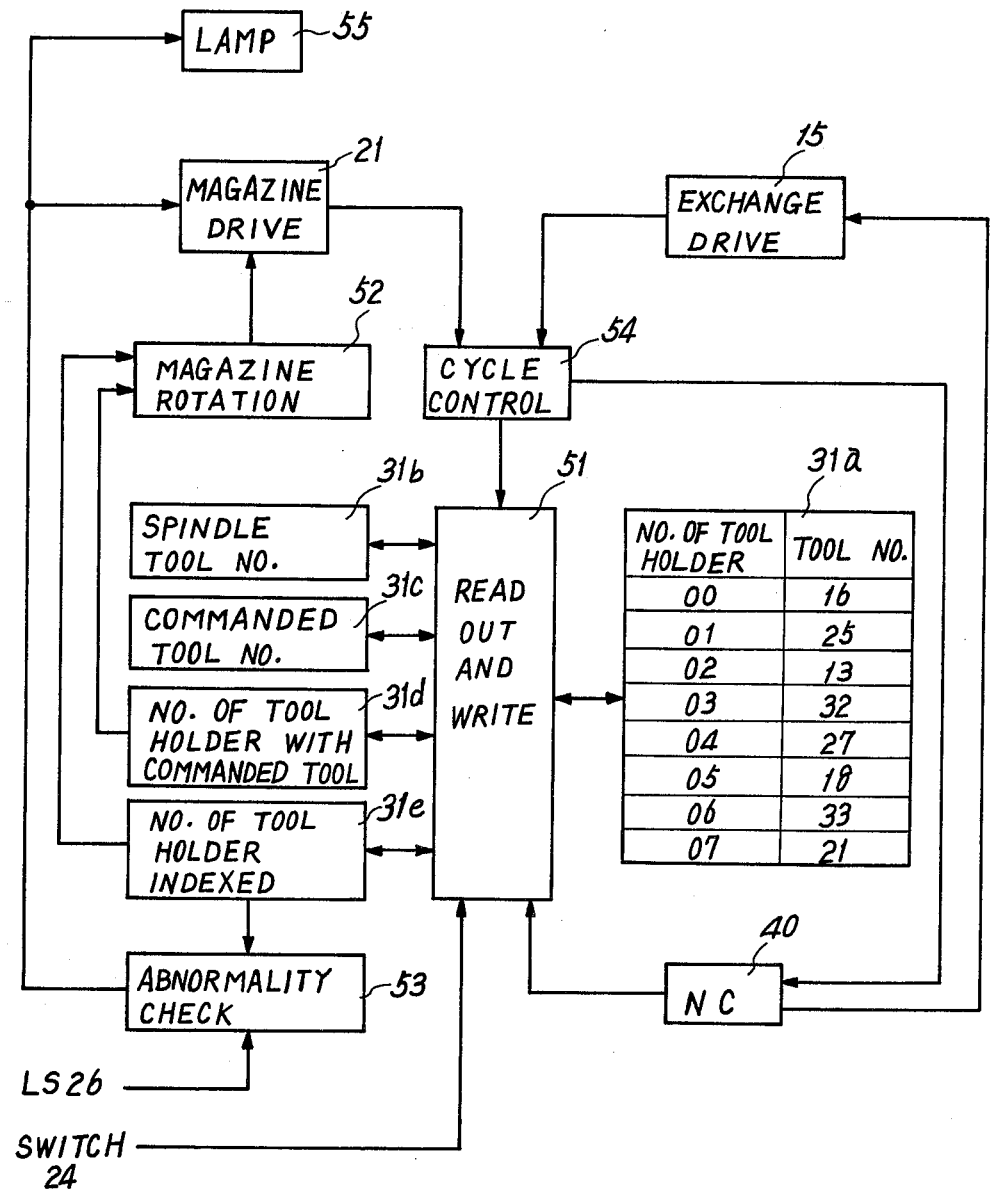
FIG. 2 is a block diagram for describing an operation of a computer shown in FIG. 1.

FIG. 2 shows a block diagram for describing the operation of the computer 30. The computer 30 operates as a reading-out and writing circuit 51, a magazine rotation control circuit 52, an abnormality check circuit 53 and a cycle control circuit 54.

The reading-out and writing circuit 51 reads out and writes the binary coded contents of the respective areas 31a and 31b, 31c, 31d and 31e of the memory device 31. More specifically, the reading-out and writing circuit 51 writes data for a required tool in the area 31c upon receipt of the same from the NC device 40, and writes the number of a tool holding device holding the required tool in the area 31d after searching or scanning the same in the area 31a. When a tool exchange operation has been completed, the reading-out and writing circuit 51 writes the tool number stored in the area 31b into a tool number column in the area 31a corresponding to the number of the tool holding device stored in the area 31d and writes the tool number stored in the area 31c into the area 31b.

The magazine rotation control circuit 52 controls the rotational direction and the amount of rotation of the tool storage magazine 10. The magazine rotation control circuit 52 detects the difference in the numbers of the tool holding devices stored in the areas 31d and 31e and causes the magazine driving device 21 to rotate the magazine 10 either in a forward direction or in a reverse direction in accordance with the detected difference, in order to increase the speed of indexing of the tool holding device holding the required tool into the tool change position 14. The magazine rotation control circuit 52 also checks whether the content in the area 31e coincides with the content in the area 31d.

The abnormality check circuit 53 examines whether the correct tool holding device is indexed at the tool change position 14, after the magazine indexing operation has been performed. When the limit switch 26 is actuated but the least significant digit bit in the area 31e is in the logic "1" state, or when the limit switch 26 is not actuated but the least significant digit bit in the area 31e is in the logic "0" state, the abnormality check circuit 53 causes the magazine driving circuit 21 to stop the rotation of the magazine 10 and a lamp 55 to be illuminated to indicate the abnormality. On the other hand, when the limit switch 26 is actuated and the least significant digit bit in the area 31e is in the logic "0" state, or when the limit switch 26 is not actuated and the least significant digit bit in the area 31e is in the logic "1" state, the abnormality check circuit 53 causes the magazine driving circuit 21 to stop the rotation of the magazine 10 in order to perform a tool exchange operation.

The cycle control circuit 54 receives a signal from the magazine driving device 21 upon completion of a normal indexing operation to thereby cause the NC device 40 to apply tool exchange command data to the exchange device driving circuit 15. After a tool exchange operation has been completed, the cycle control circuit 54 receives a signal from the exchange device driving device 15 to thereby cause the reading-out and writing circuit 51 to rewrite the contents of the areas 31a and 31b.

Figure 3:
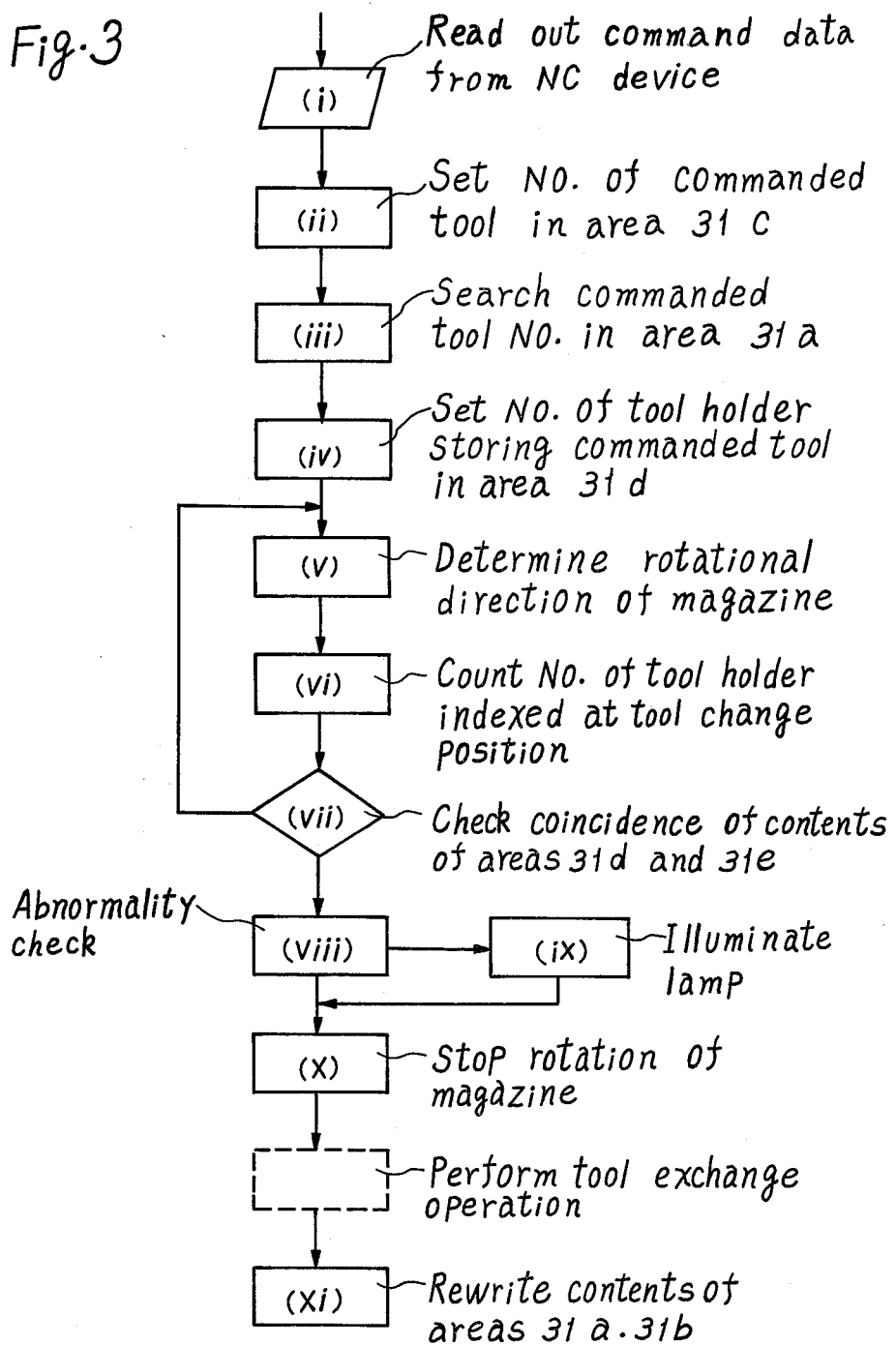
FIG. 3 is a flow chart of a tool magazine index cycle.

The operation of the present embodiment will now be described with reference to a flow chart shown in FIG. 3.

It is to be assumed that a machining operation is being performed by a tool T14 held in the spindle 12 and the tool holding device HO0 is indexed at the tool change position 14. In this case, the area 31b of the memory device 31 stores the number 14 of the tool held in the spindle 12, and the area 31e stores the number 00 of the tool holding device indexed at the tool change position 14. After the machining operation has been completed by the tool T14, the next required tool T32 is assumed to be commanded by the NC device 40. The command data from the NC device 40 is read out by the reading-out and writing circuit 51 in step (i). In accordance therewith, the number 32 of the commanded tool is stored in the area 31c of the memory device 31 in step (ii). The commanded tool number 32 is then searched or scanned in the table in the area 31a in step (iii). As a result of the search in step (iii), the number 03 of the tool holding device which holds the commanded tool T32 is set in the area 31d of the memory device 31 in step (iv). At the next step (v), the magazine rotation control circuit 52 detects the difference in the numbers of the tool holding devices stored in the areas 31d and 31e and causes the magazine driving device to rotate the magazine 10 in a reverse or counterclockwise direction in accordance with the detected difference, so as to thereby increase the speed of indexing of the tool holding device HO3 into the tool change position 14. Each time the magazine 10 is rotated one pitch in the reverse direction, the proximity switch 24 is actuated to generate an index signal to increase the content of the area 31e so as to count the number of the tool holding device indexed at the tool change position 14 in step (vi). At the step (vii), the content of the area 31e is compared with the content of the area 31d by the magazine rotation control circuit 52. If as a result of step (vii) the content of the area 31e does not coincide with the content of the area 31d, the operation returns to the step (v). If the result of step (vii) shows that the content of the area 31e coincides with the content of the area 31d, the operation proceeds to the next step (viii). At the step (viii), the abnormality check circuit 53 examines whether the correct tool holding device is indexed at the tool change position 14. If the abnormality is found as a result of step (viii), the abnormality check circuit 53 causes the lamp 55 to be illuminated and the magazine driving circuit 21 to stop the rotation of the magazine 10 at step (ix). If the result of step (viii) shows the correct indexing of the tool holding device, the magazine rotation control circuit 52 causes the magazine driving device 21 to stop the rotation of the magazine 10 at step (x). Accordingly, in a normal operation, the tool holding device HO3 holding the next tool T32 is indexed to the tool change position 14 at the end of step (x). Upon completion of the indexing operation, the cycle control circuit 54 receives a signal from the magazine driving device 21 to thereby cause the NC device 40 to apply tool exchange command data to the exchange device driving device 15. The exchange device driving device 15 is thus operated to cause the tool change device 13 to perform the tool exchange operation. Upon completion of the tool exchange operation, the exchange device driving device 15 applies a signal to the cycle control circuit 54 to thereby cause the reading-out and writing circuit 51 to rewrite the number 32 into the area 31b and the number 14 into the tool number column corresponding to the number 03 of the tool holding device in the area 31a at step (xi).

Obviously, numerous modifications and variations of the present invention are possible in light of the above teachings. It is to be understood therefore that within the scope of the teachings herein, and the appended claims, the invention may be practiced otherwise than as specifically described herein.

What is claimed as new and desired to be secured by Letters Patent of the United States is:

1. An index device for indexing a rotatable magazine, having a plurality of tool holding devices which store a variety of tools and are addressed in a numerical order, to a predetermined tool change position for a tool exchange operation between a tool indexed at the tool change position and a tool held in a spindle of a machine tool by means of a tool exchange device comprising:
    means for generating an index signal each time each tool holding device is indexed to the tool change position;
    means mechanically responsive to rotational movement of the magazine for generating a check signal each time any one of the tool holding devices having one of an odd number address code and an even address code is indexed to the tool change position;
    means for rotating said rotatable magazine;
    means for commanding in a binary code a tool to be indexed to the tool change position;
    first memory means for storing a binary coded number of a tool held in the spindle;
    second memory means for storing a relationship between binary coded numbers of the tool holding devices and the tool held in the respective tool holding devices;
    third memory means responsive to said command means for storing a binary coded number of the commanded tool;
    fourth memory means responsive to said index signal generating means for storing a binary coded number of a tool holding device indexed at the tool change position;
    means responsive to said command means for searching for a number of a tool holding device holding the commanded tool from said second memory means;
    fifth memory means responsive to said searching means for storing the searched number of the tool holding device;
    means for determining a rotational direction of said magazine in accordance with a difference in the contents stored in said fourth and fifth memory to thereby cause said rotating means to rotate said magazine and for checking coincidence of the contents in said fourth and fifth memory means;
    abnormality check means for checking, in accordance with said check signal generating means and said fourth memory means, whether a tool holding device holding the commanded tool is correctly indexed to the tool change position after the coincidence of the contents in said fourth and fifth memory means has been found and for causing said rotating means to stop rotation of said magazine to thereby cause a tool exchange operation to be performed when the abnormality is not found; and
    means for loading the content of said third memory means into said first memory means and for loading the content of said first memory means into said second memory means after the tool exchange operation has been completed.

2. An index device as claimed in claim 1, wherein said check signal generating means comprises a plurality of dogs mounted on the periphery of said magazine and corresponding in number to said tool holding devices each having said one of an odd number address code and an even number address code; and a limit switch adapted to be actuated by each of said dogs when the associated tool holding device having said one of an odd number address code and an even number address code is indexed to the tool change position.

3. An index device as claimed in claim 2, wherein said abnormality check means comprises means for checking an abnormality in accordance with the status of said limit switch and the status of the least significant digit bit of the content in said fourth memory means.

4. An index device as claimed in claim 1, wherein said abnormality check means comprises means for causing a lamp to be illuminated when an abnormality is found.

5. An index device as claimed in claim 3, wherein said abnormality check means detects the occurrence of an abnormality when said limit switch is actuated but the least significant digit bit of the content is said fourth memory means is in the logic "1" state.

6. An index device as claimed in claim 5, wherein said abnormality check means detects the occurrence of said abnormality also when said limit switch is not actuated but the least significant digit bit of the content in said fourth memory means is in the logic "0" state.

* * * * *